(12) United States Patent
Pierini et al.

(10) Patent No.: US 8,133,963 B2
(45) Date of Patent: *Mar. 13, 2012

(54) POLYPROPYLENE COMPOSITION FOR AIR QUENCHED BLOWN FILMS

(75) Inventors: Peter E. Pierini, Lake Jackson, TX (US); Shaun E. Pirtle, Coweta, OK (US)

(73) Assignee: Braskem America, Inc., Philadelphia, PA (US)

( * ) Notice: Subject to any disclaimer, the term of this patent is extended or adjusted under 35 U.S.C. 154(b) by 362 days.

This patent is subject to a terminal disclaimer.

(21) Appl. No.: 12/474,776

(22) Filed: May 29, 2009

(65) Prior Publication Data

US 2010/0028702 A1 Feb. 4, 2010

Related U.S. Application Data

(62) Division of application No. 10/574,729, filed as application No. PCT/US2004/033121 on Oct. 7, 2004, now Pat. No. 7,563,836.

(60) Provisional application No. 60/509,152, filed on Oct. 7, 2003, provisional application No. 60/563,924, filed on Apr. 21, 2004.

(51) Int. Cl.
C08F 110/00 (2006.01)
C08F 210/06 (2006.01)
B32B 27/32 (2006.01)

(52) U.S. Cl. ........ 526/351; 526/348; 428/516; 428/518; 428/522; 428/523

(58) Field of Classification Search .................. 526/352, 526/348, 351
See application file for complete search history.

(56) References Cited

U.S. PATENT DOCUMENTS

| | | | | |
|---|---|---|---|---|
| 3,959,425 A * | 5/1976 | Herrington | ................ | 264/566 |
| 4,820,471 A | 4/1989 | van der Molen et al. | | |
| 5,284,613 A | 2/1994 | Ali et al. | | |
| 5,412,020 A | 5/1995 | Yamamoto et al. | | |
| 5,532,325 A | 7/1996 | Oka et al. | | |
| 5,538,804 A * | 7/1996 | Ogale | .......................... | 428/515 |
| 5,591,785 A | 1/1997 | Scheve et al. | | |
| 5,641,848 A | 6/1997 | Giacobbe et al. | | |
| 6,090,903 A * | 7/2000 | Kataoka et al. | ................ | 526/351 |
| 6,156,690 A | 12/2000 | Hosaka et al. | | |
| 6,162,887 A * | 12/2000 | Yamada et al. | ................ | 526/351 |
| 6,231,936 B1 | 5/2001 | Kozimor et al. | | |
| 6,274,678 B1 | 8/2001 | Shinozaki et al. | | |
| 6,284,857 B1 | 9/2001 | Shinozaki et al. | | |
| 6,320,009 B1 * | 11/2001 | Nakano et al. | ................ | 526/351 |
| 6,403,708 B2 | 6/2002 | Moriya et al. | | |
| 6,472,473 B1 | 10/2002 | Ansems et al. | | |
| 6,476,173 B1 * | 11/2002 | Lin et al. | ................ | 526/351 |
| 6,815,490 B2 | 11/2004 | Seelert et al. | | |
| 7,087,680 B2 * | 8/2006 | Pierini et al. | ................ | 525/240 |
| 7,361,720 B2 * | 4/2008 | Pierini et al. | ................ | 526/351 |
| 7,378,476 B2 * | 5/2008 | Carlson et al. | ................ | 526/227 |

FOREIGN PATENT DOCUMENTS

| | | |
|---|---|---|
| DE | 197 27 065 A1 | 1/1998 |
| EP | 0 651 014 A1 | 5/1995 |
| EP | 0 659 830 A1 | 6/1995 |
| EP | 0 757 069 A1 | 2/1997 |
| EP | 0 903 356 A1 | 3/1999 |
| EP | 0 919 572 B1 | 6/1999 |
| EP | 0 942 013 B1 | 9/1999 |
| WO | WO-97/33941 | 9/1997 |
| WO | WO-99/20663 | 4/1999 |
| WO | WO-99/24479 A1 | 5/1999 |
| WO | WO-00/08078 A1 | 2/2000 |
| WO | WO-01/40374 | 6/2001 |
| WO | WO 02/16455 A1 * | 2/2002 |
| WO | WO 02/16480 A2 * | 2/2002 |
| WO | WO-03/037981 A1 | 5/2003 |
| WO | WO 2004/033509 A1 * | 4/2004 |
| WO | WO-2004/033509 A1 | 4/2004 |

OTHER PUBLICATIONS

E.P. Moore, Polypropylene Handbook, 330-332, (1996), New York, Hanser.

Chang Dae Han, et al., "Studies on Multilayer Film Coextrusion III. The Rheology of Blown Film Coextrusion," 187-199, (1978), Polymer Engineering and Science vol. 18, No. 3.

Barry A. Morris, "Peel Strength Issues in teh Blown Film Coextrusion Process," 571-577, (1996), 1996 Polymers, Laminations & Coatings Conference, TAPPI.

B. Wunderlich, "Crystal Melting," 48, (1960), Macromolecular Physics, vol. 3, New York, Academic Press.

Pijpers, Vincent, et al., "High-Speed Calorimetry for the Study of Kinetics of (De)vitrification, Crystallization, and Melting of Macromolecules," 3601, (2002), Macromolecules, vol. 35, American Chemical Society.

Andreas Krumme, et al., "Crystallisation behaviour of high density polyethylene blends with bimodal molar mass distribution 2. Non-isothermal crystallisation," 371, (2004), European Polymer Journal, vol. 40.

Th. G. Scholte, et al., "Mark-Houwink Equation and GPC Calibration for Linear Short-Chain Branched Polyolefins, Including Polypropylene and Ethylene-Propylene Copolymers," 3763-3782, (1984), Journal of Applied Polymer Science, vol. 29, John Wiley & Sons, Inc.

E.P. Otocka, et al., "Distribution of Long and Short Branches in Low-Density Polyethylenes," 507, (1971), Macromolecules, vol. 4, No. 4.

(Continued)

Primary Examiner — Rip A. Lee
(74) Attorney, Agent, or Firm — Duane Morris LLP

(57) ABSTRACT

The invention is directed to a polypropylene resin, which is suitable for manufacturing an air quenched blown film. The resin has a melt flow rate of greater than 5 g/10 min, less than 2% xylene solubles, a pentad isotacticity of greater than 95%, an isotactic pentad/triad ratio of greater than 95%, a crystallinity of at least 65%, and a crystallization temperature of at least 127° C. The polypropylene resin contains from 500 ppm to 2500 ppm of a nucleator/clarifier additive. An quenched blown film made from resin exhibits a crystallization onset temperature of at least 116° C. and a crystallization half-life time of less 4.1 seconds or less when tested using fast DSC analysis with a scan rate of 200° C./minute.

16 Claims, 9 Drawing Sheets

OTHER PUBLICATIONS

Vincent Busico, et al., "Full Assignment of the 13C NMR Spectra of Regioregular Polypropylenes: Methyl and Methylene Region," 6251-6263, (1997), American Chemical Society.

W.D. Harris, et al., "The Effects of Bubble Cooling on Performance and Properties of HMW-HDPE Films Resins," 313-316, (1990) Polymers, Laminations, & Coatings Conference.

E.P. Moore, Polypropylene Handbook, 243, (1996), New York, Hanser.

Edward P. Moore, Jr.,"Specialty Types and Developments," *Polypropylene Handbook: Polymerization, Characterization, Properties, Processing, Applications*, 403-406, Cincinnati: Hanser/Gardner Publications, Inc. (1996).

International Search Report (PCT/US2004/033121), Jan. 18, 2005.

* cited by examiner

Example 1

Comparative Example 1

Comparative Example 2

Comparative Example 1

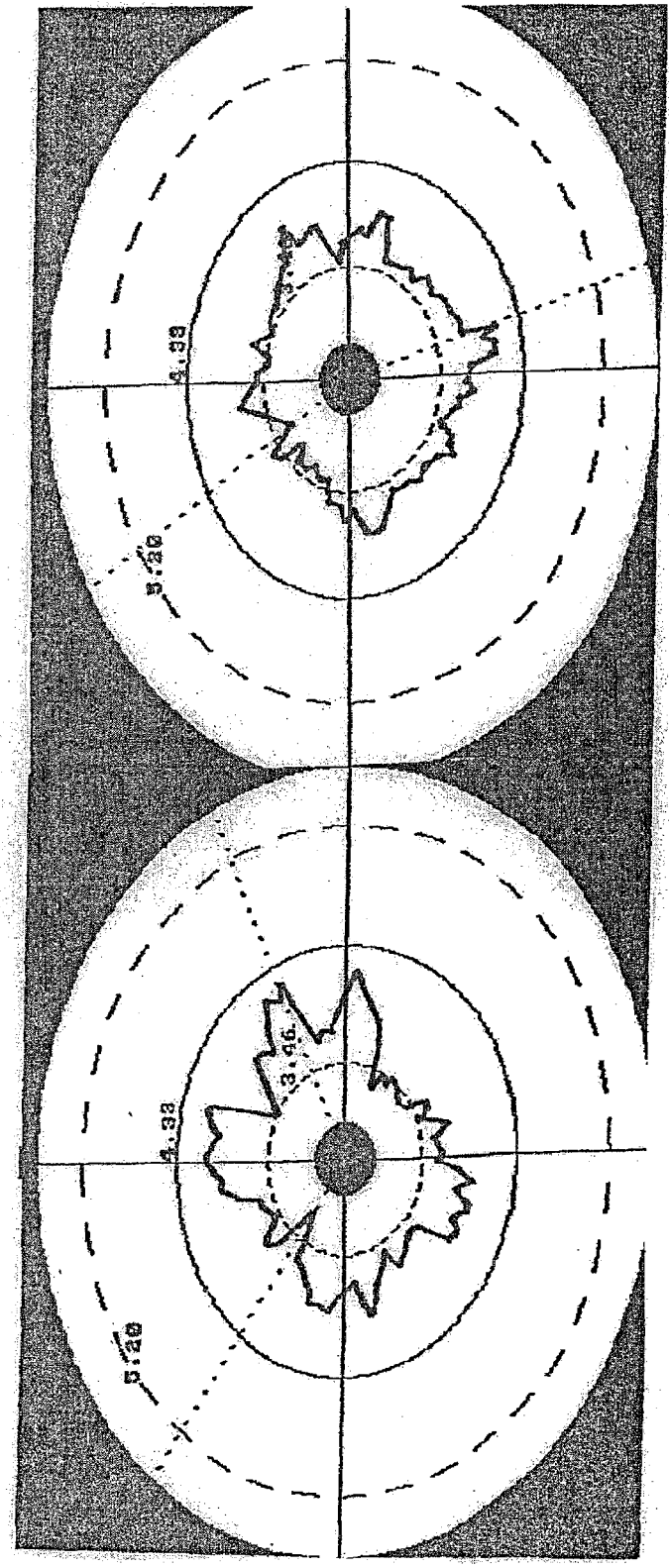

Good
Example 1

Poor
Comparative Example 2

Frost Line

POLYPROPYLENE COMPOSITION FOR AIR QUENCHED BLOWN FILMS

The present application is a divisional application Ser. No. 10/574,729, filed Apr. 5, 2006 of the U.S. Pat. No. 7,563,836, issued on Jul. 21, 2009, entitled "POLYPROPYLENE COMPOSITION FOR AIR QUENCHED BLOWN FILMS," which was a 371 National Phase Application of International Application No. PCT/US04/33121, filed on Oct. 7, 2004, entitled "POLYPROPYLENE COMPOSITION FOR AIR QUENCHED BLOWN FILMS," which claimed priority from the U.S. Provisional Application No. 60/509,152, filed on Oct. 7, 2003, entitled "POLYPROPYLENE COMPOSITION FOR AIR QUENCHED BLOWN FILMS," and from the U.S. Provisional Application No. 60/563,924, filed on Apr. 21, 2004, entitled "POLYPROPYLENE COMPOSITION FOR AIR QUENCHED BLOWN FILMS," the teachings of which are incorporated by reference herein, as if reproduced in full hereinbelow.

This invention relates to polyolefins, more particularly relating to high crystalline propylene-based polymer compositions suitable for manufacturing films using air quenched blown film production methods, methods for making such films and the films made from such polymers.

BACKGROUND

Currently, blown films are made predominantly from ethylene polymers. There are references to blowing films of propylene polymers, but none are observed to be commercially successful. Historically it was believed that the low melt strength of propylene polymers inhibited production of blown film with such polymers at commercially feasible rates on standard equipment used for processing polyethylene. Therefore, there has been a desire to increase the melt strength of propylene-based polymers to enhance the ability to manufacture air quenched blown films with such polymers.

The most common method for increasing the melt strength of propylene-based polymers has been to utilize higher molecular weight (Mw) polymers, preferably polymers having melt flow rates less than 2 g/10 min, more preferably less than 1 g/10 min, as determined by ASTM D1238-01 @ a temperature of 230° C. and using a 2.16 kg weight. Another method for increasing the melt strength of propylene-based polymers is to introduce branching into the polymer chains through methods known to one of ordinary skill in the art.

Scheve et al. in U.S. Pat. No. 5,519,785 disclosed the use of polypropylenes having a branching index less than one and having a strain hardening elongational viscosity to blow certain films. The polymers were treated with radiation under specified conditions in a multistep process which involves specialized equipment in steps after polymerization. Such a process is multi step, difficult and preferably avoided. Further, it has been discovered that polypropylene resins containing heavily branched propylene-based polymer chains tend to have reduced optical properties, such as haze and clarity, than non-branched polypropylenes.

Giacobbe and Pufka in U.S. Pat. No. 5,641,848 disclose making blown films from a propylene polymer material of broad molecular weight distribution (MWD of about 4-60), a melt flow rate of about 0.5 to 50 dg/min. and xylene insolubles (at 25° C.) of greater than or equal to 94 percent, said propylene polymer material selected from a broad molecular weight distribution propylene homopolymer and an ethylene propylene rubber impact modified broad molecular weight homopolymer. But this blend forms blown films at rates lower than those used commercially for polyethylene blown films.

The inventor's have surprisingly discovered that propylene-based films can be produced which have an excellent balance of mechanical and physical properties, such as stiffness and optical properties, at commercially acceptable rates using relatively high melt flow rate propylene-based polymers (homopolymers and copolymers) that do not exhibit and/or need to rely upon high melt strength. Further, it has been discovered that these propylene-based resins can be manufactured into both monolayer and coextruded film structures using commercially available air quenched blown film equipment that is typically used in the manufacture of polyethylene-based films.

SUMMARY OF THE INVENTION

In one aspect, the invention is a high crystalline propylene-based polymer that has a melt flow rate (MFR) determined by ASTM D1238-01 test method at 230° C. and with a 2.16 kg weight of greater than 5 g/10 min. Preferably, the MFR of the high crystalline propylene-based polymer is less than 50 g/10 min, more preferably less than 25 g/10 min. Further more preferably, the MFR of the high crystalline propylene-based polymer is from 6.0 to 20 g/10 min, even more preferably from 6.0 to 16 g/10 min, most preferably from 7 to 14 g/10 min, and in some instances 8 to 13 g/10 min. The high crystalline polypropylene also have peak crystallization temperatures of at least 127° C., preferably at least 128° C., more preferably at least 129° C., further more preferably at least 130° C., most preferably at least 133° C. measured at a 10° C./minute scan rate. The high crystalline propylene-based polymer preferably contains a nucleator/clarifier additive. The nucleator/clarifier additive is preferably used to increase the stiffness of the films made from the resin and also to increase the crystallization rate of the high crystalline propylene-based polymer during the manufacture of the air quenched blown film. This nucleator/clarifier additive will also improve the stiffness/clarity balance of the resulting film. Any additive, which simultaneously clarifies and nucleates can be used. Nucleating/clarifier additives such as ADK NA-11 (Methylene-bis(4,6-di-ter-butylphenyl)phosphate sodium salt) and ADK NA-21 (Aluminum hydroxybis[2,4,8,10-tetrakis(1,1-dimethylethyl)-6-hydroxy-12H-dibenzo[d,g][1,3,2]dioxaphoshocin 6-oxidato]) are commercially available from Asahi Denka Kokai and preferably are added to the high crystalline propylene-based polymer of the invention. Millad 3988 (3,4-Dimethylbenzylidine Sorbitol) available from Milliken & Company is another example of a Nucleator/Clarifier additive that can be utilized in the invention. The Nucleator/Clarifier additive is preferably present within the high crystalline propylene-based polymer at levels of at least 500 ppm and less than 2500 ppm; more preferably the nucleator/clarifier additive is present at levels of at least 650 ppm and less than 2000 ppm, further more preferably the nucleator/clarifier additive is present at levels of at least 750 ppm and less than 1250 ppm, most preferably the nucleator/clarifier additive is present at levels of 800 ppm to 1250 ppm.

For the propylene-based polymer composition to be effectively formed into a blown film structure having the preferred properties described later, it is important for the composition to provide a sufficiently high crystallization onset temperature and a relatively fast crystallization rate under conditions which are similar to those experienced in an air quenched blown film process.

For a composition that can be formed into an air quenched blown film at a production rate of at least 8 lb/hr-inch die circumference, Methylene-bis(4,6-di-ter-butylphenyl)phosphate sodium salt is the most preferred nucleator/clarifier additive, due to the high crystallization temperature exhibited by compositions of the invention incorporating it and fast crystallization rate achieved by such compositions, even when used at relatively low concentrations (typically less than 1000 ppm) under fast cooldown conditions (200° C./minute and above) Additionally, other nucleator/clarifier additives may preferably be utilized in the invention so long as when used in concentrations discussed above, the composition exhibits a crystallization onset temperature from a cooldown rate of 200° C./min of at least 116° C., preferably at least 120° C. and exhibits a crystallization half-life time (seconds) of 4.1 seconds or less, preferably 4.0 seconds or less when cooled at a rate of 200° C. using the procedure described in the Examples. Further, the composition preferably exhibits a steepest onset slope of less than −900 W/gram-minute (absolute value of slope of greater than 900 W/gram-minute), more preferably less than −1000 W/gram-minute when measured using a 200° C. cooldown rate as described in the Examples.

The high crystalline propylene-based polymer will exhibit a crystallinity as measured in accordance with the procedure described below of at least 65%, preferably greater than 70%, most preferably greater than 73% and in some instances greater than 75%. It is believed this high crystallinity together with the fast crystallization rate will help support the film bubble during the manufacturing of the blown film. The high crystalline propylene-based polymer also preferably has a relatively narrow molecular weight distribution (Mw/Mn) sometimes referred to as MWD is determined by the procedure described below. The molecular weight distribution is preferably less than 6, more preferably less than 5.5, further more preferably less than 5.

The high crystalline propylene-based polymers may contain a minor amount of units derived from ethylene so long as the ethylene does not adversely effect the crystallization rate of the polymer to such an extent that air quenched blown film cannot be effectively produced at commercially acceptable rates. If the high crystalline propylene-based polymers of this invention contain units derived from ethylene, such units are typically present at levels less than 2% by weight, preferably less than 1% by weight, more preferably between 0.1 and 0.7% by weight, most preferably less than 0.5% by weight of the polymer. Ethylene is added to the high crystalline propylene based polymer in order to improve the optics (such as clarity and haze) and toughness properties of the film, such as tear, dart impact and puncture, which are measured by methods known to one of ordinary skill in the art.

The high crystalline propylene-based polymers are capable of being manufactured into air quench blown films on typical polyethylene blown film production equipment at commercially acceptable production rates. In particular, the high crystalline propylene-based polymers are capable of being manufactured at rates of at least 8 lb/hr-in of die circumference, more preferably at least 9 lb/hr-in of die circumference using conventional polyethylene air quenched blown film production equipment. In this manufacturing step the film is made using at least a 1.5 blow up ratio, preferably at least a 2.0 blow up ratio, more preferably at least a 2.5 blow up ratio, and in some instances, the blow up ratio is greater than 3 and sometimes greater than 4. The higher blow up ratios will lead to balanced orientation of the film and therefore to improved film properties, such as machine direction tear and dart properties. Preferably, the melt strength is less than 8 cN, more preferably less than 6 cN, further more preferably less than 4 cN and in some instances less than 2 cN. Melt strength is measured in accordance with the procedures described in U.S. Pat. No. 6,472,473 B1 issued Oct. 29, 2002 to Ansems et al. at a temperature of 190° C.

For air quenched blown films made at commercially acceptable rates using high crystalline propylene-based homopolymer, the film exhibit a 1% Secant modulus as measured by ASTM D882 of at least 200,000 psi (measured in the cross direction (CD) and measured in the machine direction (MD)) preferably greater than 220,000 p.s.i., more preferably greater than 240,000 p.s.i. and further more preferably greater than 250,000 p.s.i. and in some cases more than 260,000 p.s.i.

For air quenched blown films made at commercially acceptable rates using high crystalline propylene-based copolymers, the films exhibit a 1% Secant Modulus of at least 150,000 p.s.i., preferably great than 165,000 p.s.i., more preferably greater than 180,000 p.s.i., most preferably greater than 200,000 p.s.i., preferably using copolymers having less than 1% by weight units derived from ethylene, together with a improved values of tear, toughness and optics compared to the films made from a high crystalline propylene-based homopolymer.

Surprisingly, the optical properties of the films made from the inventive polymers are excellent. In particular, the haze values measured for the films are excellent and surprisingly, the clarity values for films made from the inventive polymers do not drop off linearly with film thickness, for films between 0.5 and 6 mils in thickness. This is demonstrated graphically by FIG. 1 which depicts the haze & clarity values for several different monolayer films formed from the high crystalline propylene-based homopolymer of Example 1.

Preferably, the xylene soluble content of the high crystalline propylene-based homopolymers of the invention are less than 2% by weight, more preferably less than 1% by weight. For copolymers of the invention, the xylene solubles weight percent is less than 3% by weight, more preferably less than 2% by weight, most preferably less than 1.5 percent by weight.

For monolayer air quenched blown films made at commercially acceptable rates using high crystalline propylene-based homopolymers and copolymers, the films exhibit the following properties:
1) the films lay flat on the take up roll with no significant wrinkles;
2) gauge variation of less than 10%, preferably less than 5%;
3) 1 mil films exhibit haze values of less than 10, preferably less than 9, further more preferably less than 8, most preferably less than 7 as determined by ASTM D1003; and
4) 1 mil films exhibit clarity of greater than 96%, preferably greater than 97%, further more preferably greater than 98% as determined by ASTM D1746.

In a second aspect, the invention comprises a method for manufacturing a air quenched blown film at production rates of greater than 8 lb/hr-inch of die circumference using a high crystalline propylene-based polymer as described in the first aspect of the invention.

In this second aspect, the invention comprises a method for making an air quenched blown film using a high crystalline propylene based polymer as described above and in more detail in this application. In this second aspect, the film method may comprise manufacturing a monolayer film or a coextruded film structure having layers made from polymers other than the high crystalline propylene-based polymer of the invention. Preferably, at least one layer of such coextruded film structure is comprised of a polyolefin polymer, preferably a polymer wherein the major component is comprised of units derived from ethylene. As described earlier, the film is made at commercially acceptable rates of 8 lb/hr-inch of die circumference and using a blow up rate of at least 1.5, preferably at least 2.0, more preferably at least 2.5. Again, higher blow up ratios such as 3.0 and 4.0 can be utilized to improve the physical properties of the resulting films. In particular the high blow up ratios utilized to blow films with the inventive polymer will lead to monolayer films having physical properties that allow them to replace polypropylene-based uniaxially oriented (OPP) and biaxially oriented (BOPP) films. In this second aspect, the film is manufactured with less than 10% gauge variation and during the manufacturing process the film forms with a stable bubble with a uniform frost-line height above the die.

In a third aspect, the invention comprises monolayer and coextruded film structures made using the high crystalline propylene-based polymers and processes described herein.

For coextruded film applications, such as Stand-up pouches, flexible juice containers, snack food packaging, refrigerated food packaging (frozen and nonfrozen), pet food packaging, and cereal food packaging, that require relatively high stiffness and barrier properties, preferably the high crystalline propylene-based polymer made up at least 30% by weight, more preferably at least 40% by weight, further more preferably at least 50% by weight of the overall film structure. In order to improve the toughness and puncture resistance of such structures, the high crystalline propylene-based polymers preferably make up less than 90% by weight, more preferably less than 85% by weight, with the rest of the structure being comprised of ethylene-based polymers.

Films made from the high crystalline propylene-based polymer of this invention have very smooth surfaces. Also, coextruded structures utilizing this high crystalline propylene-based polymer also have high heat stability, and good clarity. These characteristics, together with a ethylene-based layer, will lead to multilayer blown film structures that can be made using cheaper and more efficient manufacturing methods (i.e. less steps required) than comparable multilayer laminate film structures made by laminating a polypropylene based BOPP layer to a ethylene-based layer.

Some examples of polymers that can be coextruded with the high crystalline propylene-based polymer include: EVOH, PVDC, Saran, EVA, EAA, malaic anhydride grafted polypropylene or polyethylene, EMA, and other ethylene-acrylate and acrylic acid copolymers.

Due to the high crystallinity, uniform biaxial orientation of the films made from this invention, have excellent water vapor transmission rates (relatively low) properties, and acceptable oxygen transmission rate properties. Preferably the monolayer films of the invention of have water vapor transmission rates (WVTR) of less than 0.7 g-mil/100 in$^2$-day @38° C., more preferably less than 0.6 g-mil/100 in$^2$-day @38° C., further more preferably less than 0.5 g-mil/100 in$^2$-day @38° C. These monolayer films of this invention have similar oxygen transmission rates similar to films made from polyethylene. These type of properties may be important for applications such as cereal packaging, potato and corn chip packaging and food packaging in general.

BRIEF DESCRIPTION OF THE FIGURES

FIGS. 6a & b are graphs showing the gauge variation for films made from the resins of Example 1 and Comparative Example 2, respectively. The gauge variation is measured using a Mocon capacitance gauging system that measured the gauge of the film along the cross direction and shows how the gauge (i.e. thickness of the film) varies around the circumference of the film.

DETAILED DESCRIPTION OF THE INVENTION

Figure 1:
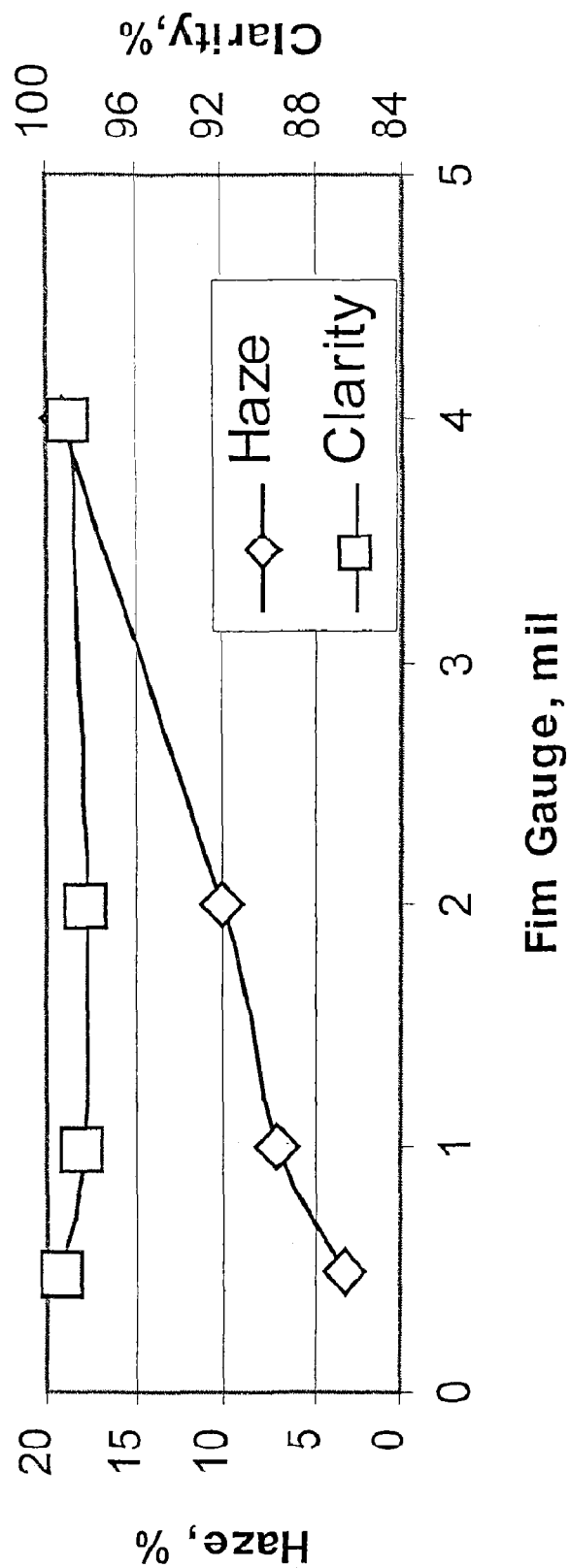
FIG. 1 is a graph depicting the haze and clarity values versus film gauge for monolayer films made from the resin of Example 1. Haze is measured in accordance with ASTM D1003 and clarity is measured in accordance with ASTM D1764.

The high crystalline propylene-based polymers of the invention preferably comprise polymers characterized by the following equation (1):

$$FM/((XS-0.74\% E)*MWD) \geq 30{,}000 \text{ p.s.i} \qquad \text{EQ (1)}$$

wherein XS≦2 wt %+% E; and

MWD≦6; and

The melt flow rate of the polymer is greater than 5 g/10 min, preferably greater than 6 g/10 min; and Where FM is the 1% secant flexural modulus measured in accordance with procedure ASTM D790-00, XS is weight percent of the xylene soluble content of the resin measured in accordance with the procedure described below, and MWD is defined as Mw/Mn. % E is the weight percent of units derived from ethylene in the polypropylene. Preferably, the MWD of the polypropylene homopolymer is less than 5.5, more preferably less than 5. Preferably the XS≦2 wt %+% E/2. The polypropylene resins preferably are nucleated/clarified with a nucleator/clarifier additive.

In addition to the properties set forth earlier, the high crystalline propylene-based polymer of the invention has a melt flow rate at 230° C. of greater than 5, an isotactic pentad/triad ratio of preferably greater than 95%, more preferably greater than 96%, further more preferably greater than 98%, most preferably greater than 99%. The pentad isotacticity of the high crystalline propylene-based homopolymer of this invention is preferably at least 95%, more preferably at least 96%, further more preferably at least 97%, and most preferably at least 98%. The pentad isotacticity of the high crystalline propylene-based copolymer of this invention preferably is at least 91%, preferably at least 92%, more preferably at least 94%, further more preferably at least 95%, and most preferably at least 96%.

Film Forming

Compositions of the invention are advantageously useful in making blown films. The technique of blown film extrusion is well known for the production of thin plastic films. In an advantageous process, plastics, such as low, linear low, and high density polyethylene (LDPE, LLDPE, and HDPE) are extruded through a circular die to form a film. Air is introduced through the center of the die to maintain the film in the form of a bubble which increases the diameter of the film about 1.5 to 6 fold, after which the bubble is collapsed onto rollers. There are a number of variations of such a process within the skill in the art, for instance as described in such references as U.S. Pat. Nos. 3,959,425; 4,820,471, where the difference between high (referred to as "long stalk" therein) and low stalk film blowing is discussed at column 1; U.S. Pat. No. 5,284,613; W. D. Harris, et al in "Effects of Bubble Cooling on Performance and Properties of HMW-HDPE Film Resins", *Polymers, Laminations & Coatings Conference, Book* 1, 1990, pages 306-317; and, Moore, E. P., *Polypropylene Handbook*, Hanser, New York, 1996, pages 330-332. The term "Stalk" is used to designate the neck height of a bubble of polymer being formed into a film on an air quenched blown film line. Most references to blowing polyolefin films disclose processes used for polyethylene, but these are applicable to the high crystalline propylene-based polymers of the current invention with few modifications within the skill in the art without undue experimentation. For instance, cooling is often advantageously modified because the art recognizes that polypropylene cools and crystallizes at a rate different from that of polyethylene. Therefore, adjustments to the cooling parameters often produce a more stable bubble at desired output rates.

In the formation of blown films, the melted polymer (melt) enters a ring-shaped die either through the bottom or side thereof. The melt is forced through spiral grooves around the surface of a mandrel inside the die and extruded through the die opening as a thick-walled tube. The tube is expanded into a bubble of desired diameter and correspondingly decreased thickness as previously described.

Preferably, compositions of the invention are optionally blown on the low stalk film equipment (i.e., low stalk) at rates of at least about 6 lb/hr/in of die circumference (0.298 g/s/cm of die circumference), more preferably at least about 8 lb/hr/in of die circumference (0.397 g/s/cm of die circumference), most preferably at least about 10 lb/hr/in of die circumference (0.496 g/s/cm of die circumference).

The formation of coextruded blown films is known in the art and applicable to the present invention. Articles illustrative of the art include Han and Shetty, "Studies on Multilayer Film Coextrusion III. The Rheology of Blown Film Coextrusion," *Polymer Engineering and Science*, February, (1978), vol. 18, No. 3 pages 187-199; and Morris, "Peel Strength Issues in the Blown Film Coextrusion Process," 1996 *Polymers, Laminations & Coatings Conference*, TAPPI Press, Atlanta, Ga. (1996), pages 571-577. The term "coextrusion" refers to the process of extruding two or more materials through a single die with two or more orifices arranged such that the extrudates merge together into a laminar structure, preferably before chilling or quenching. Coextrusion systems for making multilayer films employ at least two extruders feeding a common die assembly. The number of extruders is dependent upon the number of different materials comprising the coextruded film. For each different material, a different extruder is advantageously used. Thus a five-layer coextrusion may require up to five extruders although less may be used if two or more of the layers are made of the same material.

Coextrusion dies are used to form coextruded blown films. They have multiple mandrels that feed the different melt streams to the circular die lip. When feedblocks are employed to stack melt layers from two or more extruders, the resulting multilayered melt stream is then fed to the film die.

Coextruded blown films of the present invention can be formed into pouches, bags, containers and the like using packaging machinery within the skill in the art such as heat sealing devices using mandrels and the like. Pouches, bags and other containers made from this combination of materials provide excellent stiffness, optics and heat resistance and furthermore provide an excellent barrier to grease and oil and light hydrocarbons such as turpentine and the like. Coextruded blown film of the present invention can be used as a packaging substrate alone, as a liner in multi-wall bags, or a strength ply in laminated structures such as with polyethylenes used in the food packaging industry.

In multilayer films each layer advantageously imparts a desired characteristic such as weatherability, heat seal, adhesion, chemical resistance, barrier layers (e.g. to water or oxygen), elasticity, shrink, durability, hand and feel, noise or noise reduction, texture, embossing, decorative elements, impermeability, stiffness, and the like. Adjacent layers are optionally direct adhered, or alternatively have an adhesive, tie or other layer between them, particularly for the purpose of achieving adhesion therebetween. Constituents of the layers are selected to achieve the desired purpose.

In one aspect of the invention where stiffness, toughness, optics, and/or heat seal performance are important, coextruded films employing a high crystalline propylene based polymer in one layer of such a multilayer film and an ethylene polymer is used in at least one other layer. The ethylene polymer layer will improve the overall toughness of the film structure. The high crystalline propylene-based polymer may comprise a copolymer or a homopolymer of the invention as described above. In one preferred aspect of the invention, a three layer film structure is used with a high crystalline propylene-based polymer of the invention used for the core layer. This core layer is sandwiched between two ethylene polymer skin layers. These skin layers may be comprised of LDPE, LLDPE, HDPE, substantially linear polyethylene, homogeneously branched linear polyethylene, and blends thereof.

Films made of the compositions of the invention advantageously have greater stiffness.

Additives

In addition to the nucleator/clarifier additive described earlier, additives typically used with propylene-based polymers may be included in the high crystalline propylene-based polymers of the invention.

Uses

The present invention includes but is not limited to use of the films of the invention in such applications as consumer liners, heavy duty shipping sacks, produce bags, batch inclusion bags, pouches, grocery bags, merchandise bags, bags for foam packaging (especially where the foam is formed in the bag), cereal liners, soft paper overwrap, multi-wall bags, baler bags, bundling films, compression films and laminations.

Films of the current invention are also useable as heat seal films, pouches or bags and as films for retort applications.

EXAMPLES

The following test methods were used to determine the properties disclosed in the examples and the application as a whole.

Degree of crystallinity is measured by differential scanning calorimetry (DSC) using a Q1000 TA Instrument. In this measurement a small ten milligram sample of the propylene polymer is sealed into an aluminum DSC pan. The sample is placed into a DSC cell with a 25 centimeter per minute nitrogen purge and cooled to about minus 100° C. A standard thermal history is established for the sample by heating it at 10° C. per minute to 225° C. The sample is kept at 225° C. for 3 minutes to ensure complete melting. The sample then is cooled at 10° C. per minute to about −100° C. The sample is again kept isothermal at −100° C. for 3 minutes to stabilize. It is then reheated at 10° C. per minute to 225° C. The observed heat of fusion ($\Delta H_{observed}$) for the second scan over a range of 80-180° C. is recorded. The observed heat of fusion is related to the degree of crystallinity in weight percent based on the weight of the polypropylene sample by the following equation:

$$\text{Crystallinity \%} = (\Delta H_{observed})/(\Delta H_{isotactic\,pp}) \times 100 \qquad (2)$$

where the heat of fusion for isotactic polypropylene ($\Delta H_{isotactic\,pp}$) is reported in B. Wunderlich, Macromolecular Physics, Volume 3, Crystal Melting, Academic Press, New York, 1960, p 48, is 165 Joules per gram (J/g) of polymer. The peak temperature of crystallization from the melt is determined by the DSC as above with a cooling rate of 10° C./min. The peak crystallization temperature (also referred to herein as the crystallization temperature) is the temperature at which the highest differential heat flow occurs. The melting temperature is determined by the peak of the melting transition.

Fast DSC Analysis:

In order to determine the crystallization properties of the compositions at a 200° C./minute cooldown rate, fast differential scanning calorimetry (DSC) experiments are performed. The equipment utilized for the fast DSC is a Perkin Elmer model Pyris Diamond power compensation DSC equipped with a cryofill cooling unit and a model TAGS gas switching accessory. A 50:50 mixture of He:Ne at a flow rate of 50 mL/min is employed as purge gas to enhance cooling performance and to enable a stable reproducible baseline.

The temperature scale is calibrated using n-octadecane ($M_p$=28.24° C.) and indium ($M_p$=156.60° C.) and the enthalpy is calibrated with indium ($\Delta H_f$=28.45 J/g). These calibrations are performed at a scan rate of 10° C./min. Even though the calibration is performed at a lower scan rate, the calibration is also valid for higher scan rate tests, such as 200° C./minute, since a reduced sample size is used for the fast DSC runs. Details regarding the calibration of equipment and how this calibration effects different scan rates is reported in Macromolecules, 35, 3601, (2002) by T. F. J. Pijpers, V. B. F. Mathot, B. Goderis, R. L. Scherrenberg and E. W. van der Vegte.

Samples for analysis are cut from blown films of Examples 1a, 2, 3, 5 and 8. The samples are initially cut using a paper punch (6 mm diameter) and a razor blade. Two discs are cut from near the middle of the 6 mm diameter flattened film sample. These discs are trimmed with the razor blade to reduce the sample weight to 2.2 mg. All samples are crimp sealed into flat Aluminum pans available from Perkin Elmer. The crimp seal optimizes the heat transfer into and out from the sample.

The samples are analyzed by heating them to 220° C. and holding them initially at that temperature for 2 minutes. Once the holding period is complete, the temperature is reduced from 220° C. to −50° C. at a rate of 200° C./minute. During this fast DSC run temperature and heat flow data are acquired at a rate of 20 sample points per second. Two separate samples were for each composition in order to improve the reproducibility of the. In order to correct for affects of the sample pans on the heat flow, a baseline file (two empty sample pans) is collected at the start of the day using the same temperature profile as that used for the samples. This baseline file is subtracted from the data collected from the samples to provide corrected heat flow and temperature data which is used to determine the crystallization properties discussed below.

Prior to starting the runs, the system is allowed to stabilize for 60 minutes so that the liquid nitrogen cooling reservoir below the DSC ovens can be filled and reach equilibrium. At the start of this 60 minute period the ovens are opened to the atmosphere and warmed to a temperature of 500° C. This thermal treatment helps to condition the ceramic-embedded sensors under the ovens and yields a flatter and more reproducible baseline.

For this Fast DSC Analysis, the peak crystallization temperature (Tc) is the temperature at which the highest differential heat flow is observed from the corrected heat flow and temperature data. The crystallization onset temperature ($T_o$) is the temperature at which the tangent drawn from the high temperature side of the crystallization peak intercepts the peak baseline on a heat flow versus temperature plot. The crystallization half-life time is the time required to reach 50% of the final crystallinity after initiation at $T_o$. The crystallization half-life time is a reliable and simple measure of rate of crystallization in dynamic experiments as described by A. Krumme, A. Lehtinen and A. Viikna, Eur. Polym. J., 40, 371, (2004).

The steepest onset slope is another measure of the crystallization rate. The steepest onset slope is measured, using a least squares analysis, as the steepest linear section of the high temperature section of the DSC curve preceding the crystallization peak.

Molecular weight distribution (MWD) for the polypropylene homopolymers is determined by gel permeation chromatography (GPC) as follows:

The polymers are analyzed by gel permeation chromatography (GPC) on a Polymer Laboratories PL-GPC-220 high temperature chromatographic unit equipped with four linear mixed bed columns, 300×7.5 mm (Polymer Laboratories PLgel Mixed A (20-micron particle size)). The oven temperature is at 160° C. with the autosampler hot zone at 160° C. and the warm zone at 145° C. The solvent is 1,2,4-trichlorobenzene containing 200 ppm 2,6-di-t-butyl-4-methylphenol. The flow rate is 1.0 milliliter/minute and the injection size is 100 microliters. A 0.2% by weight solution of the sample is prepared for injection by dissolving the sample in nitrogen purged 1,2,4-trichlorobenzene containing 200 ppm 2,6-di-t-butyl-4-methylphenol for 2.5 hrs at 160° C. with gentle mixing.

The molecular weight determination is deduced by using ten narrow molecular weight distribution polystyrene standards (from Polymer Laboratories, EasiCal PS 1 ranging from 580-7,500,000 g/mole) in conjunction with their elution volumes. The equivalent polypropylene molecular weights are determined by using appropriate Mark-Houwink coefficients for polypropylene (as described by Th. G. Scholte, N.

L. J. Meijerink, H. M. Schoffeleers, and A. M. G. Brands, J. Appl. Polym. Sci., 29, 3763-3782 (1984), incorporated herein by reference) and polystyrene (as described by E. P. Otocka, R. J. Roe, N.Y. Hellman, P. M. Muglia, Macromolecules, 4, 507 (1971) incorporated herein by reference) in the Mark-Houwink equation:

$$\{\eta\} = KM^a$$

where $K_{pp}=1.90\text{E-}04$, $a_{pp}=0.725$ and $K_{ps}=1.26\text{E-}04$, $a_{ps}=0.702$.

Melt flow rate is measured in accordance with ASTM D 1238-01 test method at 230° C. with a 2.16 kg weight for the propylene-based polymers.

Xylene solubles are determined by dissolving 4±0.1000 g. of sample into a 250 ml Erlenmeyer flask and adding by means of a pipette 200 ml of inhibited xylene. To inhibit xylene, add 18.35 g of Irganox 1010 to 200 mls. of xylene in a beaker and stir until dissolved. After the Irganox 1010 is dissolved, pour the solution into a 4.9 gallons of xylene and thoroughly mix the solution. Introduce a stirring bar, place a water-cooled condenser on the flask and position the flask assembly on a magnetic stirrer/hot plate. Stir vigorously and adjust heating to obtain gentle boiling until the sample is completely dissolved. A nitrogen blanket should be maintained on the condenser during the procedure. After the sample is dissolved, remove the flask assembly from the magnetic stirrer/hot plate, remove the stirring bar, then cover. Let the flask cool to near room temperature (30° C., cooling takes approximately 1 hour). Place a lead ring on the flask and immerse in constant temperature water bath. After temperature inside flask reaches 25±0.5° C., let stand in water 30 more minutes. During the cooling, the insoluble portion precipitates. The solution is filtered; then a 100 ml aliquot of the filtrate is placed in an aluminum pan and evaporated to dryness under a nitrogen stream. The solubles present are determined by weighing the residual polymer.

Isotactic pentad percent, Isotactic triad percent and the Isotactic pentad/triad ratio are determined by one of ordinary skill in the art according to the following: $^{13}$C nuclear magnetic resonance (NMR) provides a direct measure of the tacticity of poly(propylene) homopolymers. The analysis used here neglects chain ends and inverse insertions.

The figure below shows the typical polypropylene triads and their associated $^{13}$C chemical shifts. For the triad names (m, mr, and rr) 'm' stands for meso, and 'r' stands for racemic. The isotactic triad percent is a measure of the mm triads.

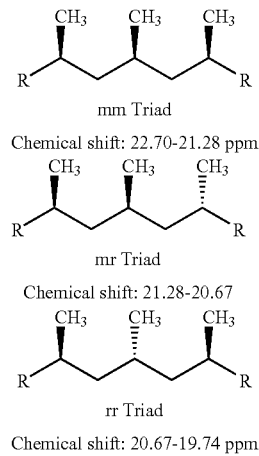

The isotactic pentad percent is a measure of the mmmm pentads. The chemical shift for mmmm pentads is 22.0-21.7 ppm.

V. Busico, R. Cipullo, G. Monaco, M. Vacatello, A. L. Segre, Macromolecules 1997, 30, 6251-6263 describes methods for determining isotactic pentad and triads using NMR analysis.

The isotactic pentad/triad ratio is the ratio of the isotactic pentad percent to the isotactic triad percent.

In determining the isotactic pentad and triad values, the samples are prepared by dissolving 0.5 g of the polypropylene homopolymer in a mixture of 1.75 g of tetrachloroethane-d2 (TCE-d2) and 1.75 g of 1,2-orthodichlorobenzene. Samples are homogenized in a heating block at 150° C. and heated with a heat gun to facilitate mixing. NMR experiments are performed on an Varian Unity+400 MHz, at 120° C., using a 1.32 sec acquisition time, 0.7 sec repetition delay, 4000 acquisitions and continuous proton decoupling (fm-fm modulation), with and without spinning the sample. Total scan time used is 2.25 hrs.

The following examples are to illustrate this invention and do not limit it. Ratios, parts, and percentages are by weight unless otherwise stated.

Example 1

A polypropylene homopolymer, Example 1, having the properties of Tables 1 and 2, is produced in a single, continuous bulk phase (condensed propylene) stirred tank reactor. A Ziegler-Natta catalyst, which includes a titanium catalytic active metal species supported on a magnesium chloride support, which is commercially available as Toho Series C, Group JC and may be purchased from Toho Titanium Ltd., is suspended in Kaydol white mineral oil, purchased from Witco, at 38 wt. % and stored in a stirred catalyst feed tank. The suspended catalyst is pumped directly into a nominal 25,000 gallon continuous, stirred tank reactor which is filled to approximately ⅔ capacity with liquid propylene. The desired temperature of the reactor is 65-68° C. controlled by condensing propylene vapor in a separate set of heat exchangers and returning the liquid stream to the reactor along with the non-condensable fraction. An external alkoxysilane donor, which is commercially available from Degussa-Huels, [(CH$_2$)$_4$CH]$_2$Si(OMe)$_2$, is fed continuously to the reactor in the amount needed to reduce the xylene extractable fraction to less than 1%, as measured by ASTM method D 790-00. The target concentration of the external donor in the liquid propylene, corrected for solids, is 150 ppm. Undiluted aluminum alkyl cocatalysts, (triethylaluminum, AlEt$_3$ commonly called TEAL) are added to the propylene feed stream to adjust the TEAL concentration in the liquid propylene to a control target of 150 ppm in the liquid propylene.

A polypropylene polymerization is conducted with the reactor polymer solids at about 40-42 wt. %. A chain transfer agent, hydrogen, is continuously fed to the reactor, to produce a 8 g/10 min MFR propylene polymer, as measured by ASTM D 1238-01 @230° C. The reactor discharge stream is degassed in a series of three vessels to separate the liquid propylene and process lights from the polypropylene powder product. The degassed powder then is forwarded to a ribbon blender/heater in 4000 lb. batches. A nucleator/clarifier additive or agent ADK NA-11, which is a complex organophosphate metal salt, is commercially available from Amfine Chemical Corp., the North American joint venture of Asahi Denka Kogyo K.K. and Mitsubishi Corp. Antioxidants Irgafos™ 168, Tris(2,4-di-t-butylphenyl) phosphite, and Irganox™ 1010, Tetrakismethylene(3,5-di-t-butyl-4-hydroxyhydrocinnamate) methane, is commercially available from CIBA Specialty Chemical. The ADK NA-11 at 850 ppm, DHT-4A at 400 ppm, Irgafos 168 at 1000 ppm and Irganox 1010 at 1000 ppm are added to the ribbon blender and mixed. DHT-4A is a hydrotalcite-like compound, $Mg_{4.3}Al_2(OH)_{12.6}CO_3 \cdot mH_2O$, that has been developed as a stabilizer (halogen scavenger) for polyolefin and other plastics. DHT-4A is sold commercially by Kyowa Chemical Industry Co., Ltd. The polypropylene powder then is dumped into a surge vessel. The powder then is continuously fed to a set of single screw extruders for compounding and pelletization. This product homopolymer is produced and placed in a rail car hopper.

Comparative Example 1

A polypropylene homopolymer of Comparative Example 1, having the properties set forth in Tables 1 and 2, is produced in the same manner as Example 1, except that a chain transfer agent, hydrogen, is continuously fed to the reactor to produce a 1.8 g/10 min MFR polypropylene polymer.

Comparative Example 2

A propylene-based homopolymer available from The Dow Chemical Company under the trade name 5E40, having the properties set forth in Tables 1 and 2.

Comparative Example 3

A propylene-based homopolymer available from The Dow Chemical Company under the trade name 5A97, having the properties set forth in Tables 1 and 2.

Monolayer Films Formed from Propylene Homopolymer and Copolymers

Blowing of Film in LD/LLDPE Extruder:

The resins of Examples 1 and Comparative Examples 1-3 were separately and independently fed to a blown film extruder having a screw diameter 2.5 inches (6.35 cm), 6 inches (15.24 cm) in die diameter, with a die gap of 70 mil (1770 micro), melt temperature of 450° F. for the resin of Example 1 and 480° F. for Comparative Example 1, die temperature about 450° F. for the resin of Example 1 and about 480° F. for the resin of Comparative Example 1, and blow up ratio (BUR) of 2.5 (giving a layflat width of 23.5 in. for the finished films), commercially available from Macro Engineering Company under the trade designation DC2900 and otherwise used according to manufacturer's directions. This blown film equipment is referred to herein as "LDPE/LLDPE" or "low stalk" because it is commonly used to blow film from low or linear low density polyethylene. The extruder is 152.4 cm long and is kept at a temperature greater than 375° F. The so called "hump style temperature" profile (which means that the temperature is higher in the compressing section than both feed and metering sections) is used with a temperature of 400° F. in the feeding section, 425° F. in the compressing section and 375° F. in the metering section.

The specifics regarding the processing parameters for making monolayer films from the resins of Example 1 and Comparative Examples 1-3 are provided below in Tables 3 and 4.

TABLE 1

| | ASTM D790-00 Flexural modulus, 1% Secant, psi | GPC Mw/Mn | GPC Mw | ASTM Melt Flow Rate, g/10 min. @ 230 C./2.16 kg | Xylene Insolubles, wt. % | Nucleating Agent, ppm | ASTM D1003 Haze % |
|---|---|---|---|---|---|---|---|
| Example 1 | 335,000 | 5 | 269,000 | 8 | 99 | ADK NA-11: 850 | 21 |
| Comparative Example 1 | 336,000 | 4.5 | 426,000 | 1.7 | 99.1 | ADK NA-11: 850 | 21 |
| Comparative Example 2 | 200,000 | 5.5 | 253,500 | 9.5 | | N/A | — |
| Comparative Example 3 | 240,000 | 5.4 | 300,400 | 3.9 | | N/A | — |

TABLE 2

| Material Description | DSC Crystallization Temp, Deg. C. | DSC Melting Temp., deg. C. | DSC Crystallinity % | NMR Triad Isotacticity % | NMR Pentad Isotacticity % |
|---|---|---|---|---|---|
| Example 1 | 133 | 168 | 76 | | |
| Comparative Example 1 | 133.8 | 168.4 | 73.6 | 99.09 | 98.94 |
| Comparative Example 2 | ~110 | ~162.3 | ~66.7 | | |
| Comparative Example 3 | ~110 | ~162.5 | ~64.2 | | |

TABLE 3

MONOLAYER FILMS FORMED FROM RESINS OF
EXAMPLES AND COMPARATIVE EXAMPLES

|  | Comparative Example 1 | Comparative Example 2 | Comparative Example 3 | Example 1 |
|---|---|---|---|---|
|  | Blown 2.0 mil | Blown 2.0 mil | Blown 2.0 mil | Blown 1.0 mil |
| Maximum output rate | 170 lb/hr | 151 lb/hr | 179 lb/hr | 172 lb/hr |
| Extruder Back Pressure (barrel) | 2000 p.s.i. | 830 p.s.i. | 2200 p.s.i. | 1000 p.s.i. |
| Specific Output Rate lb/inch die circumference-hr | 9.02 | 8.01 | 9.5 | 9.12 |
| Water Vapor transmission Rate (WVTR) (38° C./100% Relative Humidity(RH) g-mil/100 in$^2$-day (ASTM F1249) | 0.72 | — | — | 0.49 |
| WVTR (38° C./90% RH) g-mil/100 in$^2$-day | 0.65 | — | — | 0.44 |
| Oxygen Transmission Rate (53% RH/1% O2) Cc-mil/100 in$^2$-day-atm O2 (ASTM D3985) | 172 | — | — | 182 |

TABLE 4

OPTICS

| Example 1 (mils) | Transmittance (ASTM D 1746) | Haze (ASTM D1003) | Clarity (ASTM D1746) |
|---|---|---|---|
| 0.5 | 93.8 | 3.3 | 99.2 |
| 1.0 | 93.2 | 6.9 | 98.4 |
| 2.0 | 93.1 | 10.1 | 98.1 |
| 4.0 | 93.6 | 19.0 | 98.8 |
| Comparative Example 1 (2 mil) | 93.6 | 4.3 | 92.0 |
| Comparative Example 2 (2 mil) | 91.3 | 64.6 | 10.0 |
| Comparative Example 3 (2 mil) | 91.8 | 43.5 | 40.0 |

TABLE 5

Film Physical Properties

| ASTM D882 | Comparative Example 1 | Example 1 |
|---|---|---|
|  | Blown 1.0 mil | Blown 1.0 mil |
| Cross Direction (CD) 1% Secant (p.s.i) | 206,000 | 265,000 |
| CD 2% Secant (p.s.i.) | 171,000 | 192,000 |
| Machine Direction (MD) 1% Secant (p.s.i.) | 250,000 | 261,000 |
| MD 2% Secant (p.s.i.) | 195,000 | 199,000 |
| CD % Elongation at break (%) | 4 | 3 |
| CD Peak Load at break (lb) | 4.5 | 4.5 |
| CD Tensile at break (p.s.i.) | 4598 | 4457 |
| MD % Elongation at break (%) | 451 | 6 |
| MD Peak Load at break (lb) | 6.5 | 5.6 |
| MD Tensile at break (p.s.i.) | 6622 | 5659 |

Figure 2:
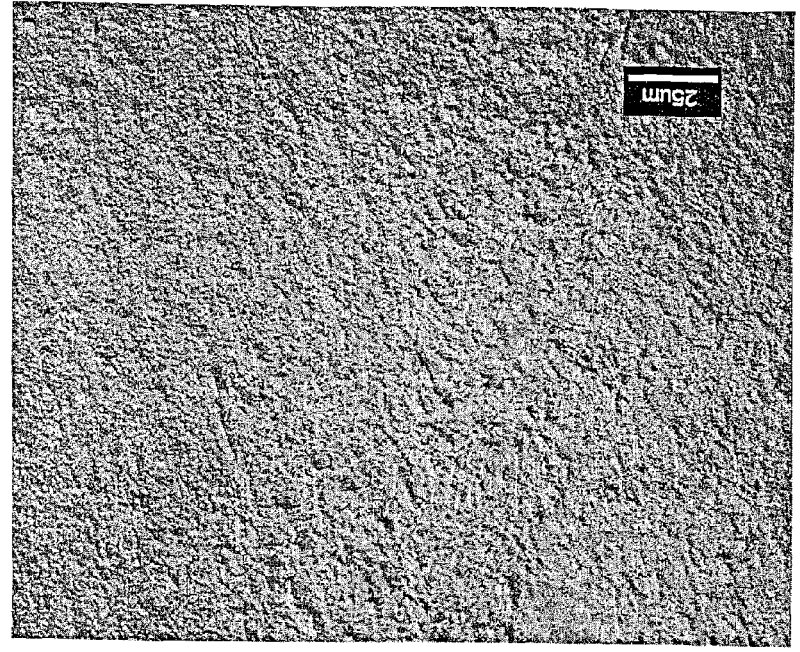
FIG. 2 is a light microscopy micrograph of the surface of a monolayer blown film made from the resin of Example 1.
Figure 3:
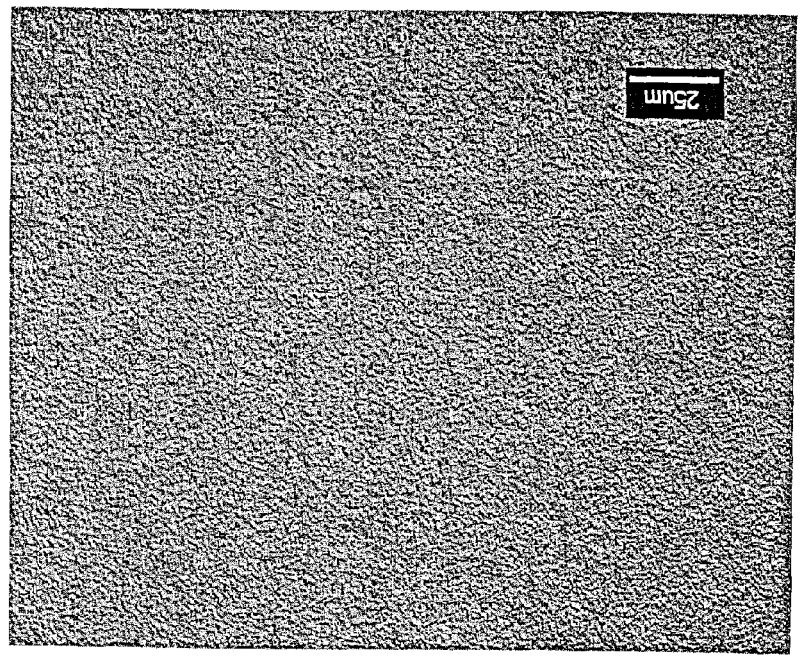
FIG. 3: is a light microscopy micrograph of the surface of a monolayer blown film made from the resin of Comparative Example 1.
Figure 4:
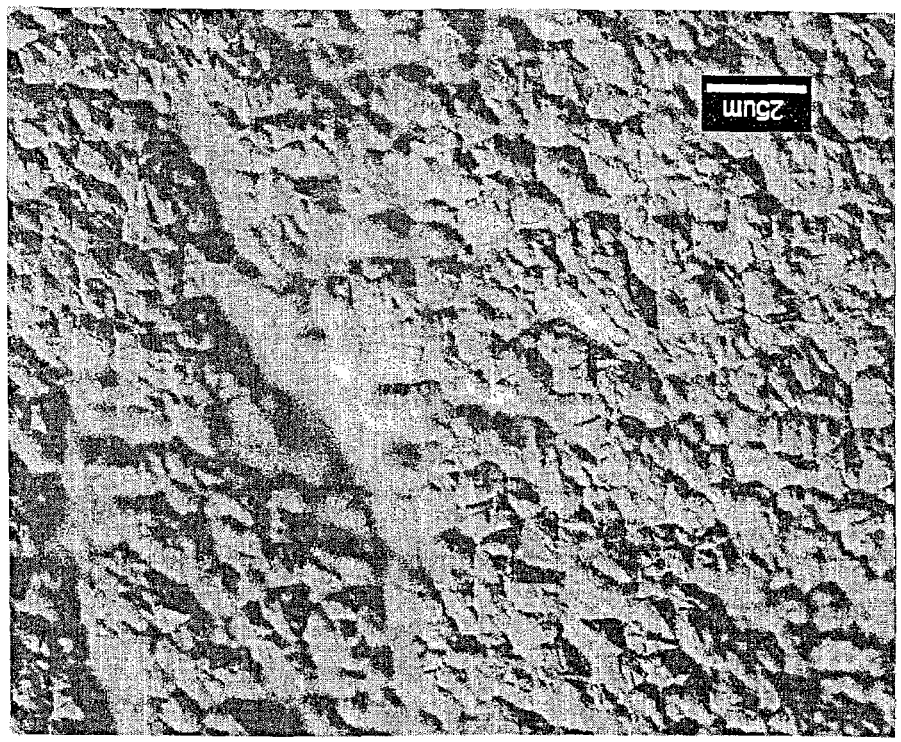
FIG. 4: is a light microscopy micrograph of the surface of a monolayer blown film made from the resin of Comparative Example 2.

FIGS. 2, 3, and 4 show the Nomarski images of the films surfaces for the films obtained from Example 1, Comparative Example 1 and Comparative Example 2, respectively obtained using light microscopy (Olympus Vanox-S model AHBS research microscope series #808002 from Olympus Company (Tokyo, Japan)). As can be seen from these figures, the blown films made from the resin of Example 1 have much smoother surface, which leads to better optical properties. In particular and unexpectently, the clarity measured in the films made from the resin of Example 1 does not drop off linearly with film thickness. This advantageous property will lead to thicker films that still maintain acceptable clarity. The data for Clarity and Haze for monolayer blown films made from the resins of Example 1 are also shown in FIG. 1.

Table 5, below shows the mechanical properties exhibited by 1.0 mil monolayer blown films made from the resins of Example 1 and Comparative Example I, which are made in accordance with the description set forth above.

1% and 2% Secant modulus for all the films herein is measured in the accordance with ASTM D882.

The processing information for these 1.0 mil films are in accordance with the processing conditions listed in Table 3 for each of the resins.

Figure 5:
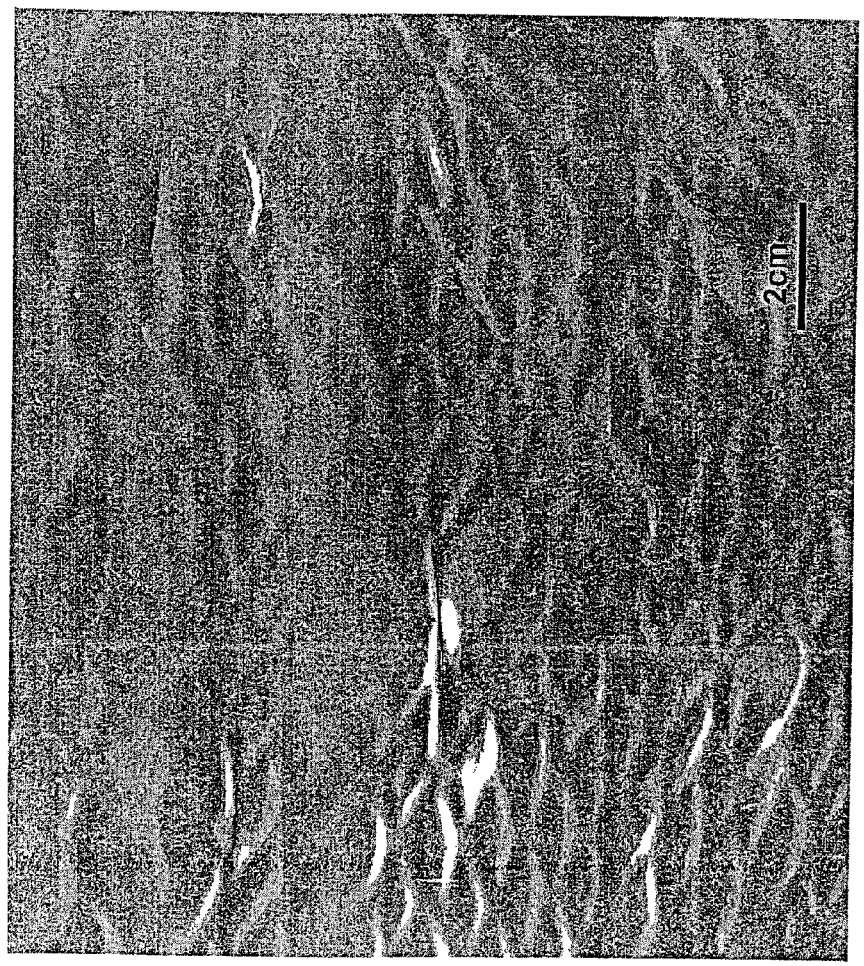
FIG. 5: is a light microscopy micrograph of the surface of a monolayer blown film made from the resin of Comparative Example 1, which shows regular and irregular cross-hatch pattern exhibited by the film.
Figure 7A:
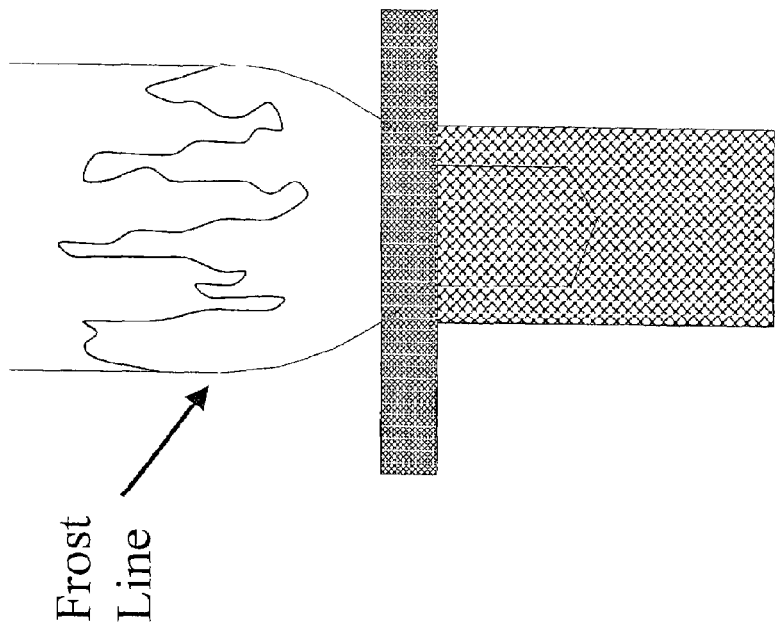
FIGS. 7a & b is an illustration showing the variation of frostline height above the die for films made from the resins of Example 1 and Comparative Example 2, respectively.
Figure 7B:
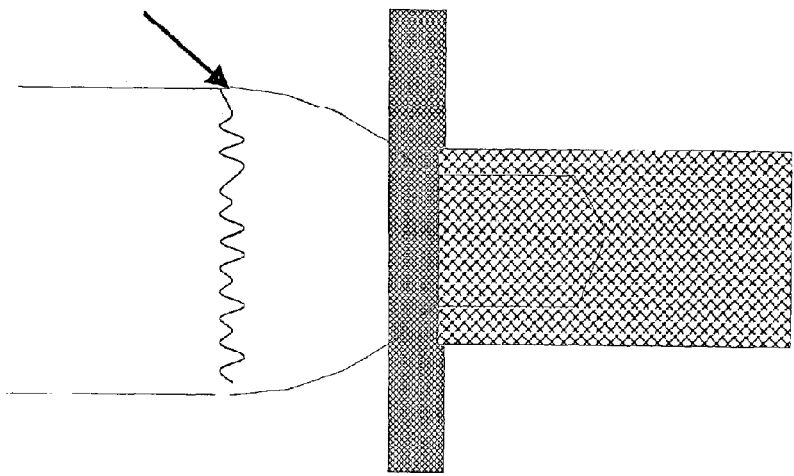

As can be seen from Table 5, the inventive resins result in blown films having much better film modulus (both 1% and 2% in both the cross direction and machine direction as compared to films made from a similar high crystalline polymer, but with a lower melt flow rate. Additionally, as can be seen from FIGS. 2 and 3, the films made from the resins of Example 1 had smoother surface than the films made from Comparative Example 1. Further, the monolayer blown films made from the resin of Example 1 were much flatter and wrinkle-free (on the take-up film roll) than monolayer blown films made from the resins of Comparative Examples 2 and 3. Also, as can be seen from FIG. 5, the monolayer blown films made from the resins of Comparative Example 1 exhibit a mixture of regular and irregular cross-hatched patterns that lead to poor optics for the overall film, and therefore are not acceptable for most film applications. The film made from the resin of Example 1 do not show such regular and irregular cross-hatch patterns. Finally, as can be seen from FIGS. 6*a* and 6*b*, the resins of Example 1 are readily processed into films having uniform gauge variation as compared to the resins of Comparative Example 2. During the processing of the monolayer blown films of the resins of Example 1 exhibit a much more uniform frostline height than the comparable films made from the resins of Comparative Example 2 (as shown in FIGS. 7*a* and 7*b*).

Coextruded Films Formed from the Resin of Example 1

The Following Resins were Used for this Example:

EO 1: Is a 1 MI, 0.920 g/cc, linear low density ethylene/1-octene copolymer resin available from The Dow Chemical Company under the trade name DOWLEX 2045G. EO 2: Is a 1 MI, 0.902 g/cc substantially linear ethylene/1-octene copolymer resin available from The Dow Chemical Company under the trade name Affinity PL 1880. PP 1: is the resin of Example 1.

Table 6 below shows the physical and mechanical properties for several coextruded films made with the resin of Example 1 and the polyethylene copolymers listed above. The table shows that coextruded film structures can be made with the inventive polymer that exhibit high modulus, together with better toughness, tear, dart, puncture, and heat seal and hot tack performance than can be obtained from a monolayer film structure made from the inventive polypropylene alone. These structures will also have higher modulus than coextruded film structures made with conventional polypropylene resins. The coextruded film structures of this invention exhibit physical and mechanical properties that are sufficient to compete with laminated structures made from laminating BOPP polypropylene films with polyethylene films. The coextruded film structures of the current invention can be made much more efficiently, with fewer manufacturing steps and lower overall scrap rates, which will lead to much lower manufacturing costs than comparable laminated BOPP film structures. For the Coex's listed in Table 6, the Affinity PL 1880 is typically used as a sealant layer.

TABLE 6

| | | Coextruded Films | | | |
|---|---|---|---|---|---|
| | | Coex 1 | Coex 2 | Coex 3 | Coex 4 |
| Total Film Thickness | | 1 mil | 2 mil | 1 mil | 2 mil |
| Film Structure (Weight Percent for each layer | ASTM D882 | 50% PP1/30% EO 1/20% EO 2 | 50% PP1/30% EO 1/20% EO 2 | 30% PP1/50% EO 1/20% EO 2 | 30% PP1/50% EO 1/20% EO 2 |
| Secant Modulus - CD | CD 1% SECANT (PSI) | 168928.4 | 158035.3 | 102770.0 | 106389.7 |
| | CD 2% SECANT (PSI) | 134164.3 | 120026.6 | 88235.4 | 87361.7 |
| | CD Std Dev 1% SECANT | 10640.0 | 17398.7 | 21694.2 | 5450.9 |
| | CD Std Dev 2% SECANT | 6076.8 | 6892.8 | 7913.0 | 4019.6 |
| Secant Modulus - MD | MD 1% SECANT (PSI) | 182783.0 | 164786.6 | 115717.9 | 109664.5 |
| | MD 2% SECANT (PSI) | 139810.9 | 125309.0 | 90309.8 | 87119.7 |
| | MD Std Dev 1% SECANT | 16946.3 | 8774.8 | 21042.2 | 13575.5 |
| | MD Std Dev 2% SECANT | 5323.1 | 3665.2 | 6297.1 | 5889.8 |
| Tensile - CD | % Elongation at break (%) | 416.2 | 8.8 | 615.2 | 623.4 |
| | Tensile at break (PSI) | 3471.1 | 3788.2 | 4308.6 | 4408.7 |
| | Yield Stress (PSI) | 3471.1 | 2566.7 | 2676.4 | 2824.8 |
| | Std Dev % Elongation | 36.9 | 2.4 | 33.9 | 36.0 |
| | Std Dev tensil at breakl | 210.8 | 82.4 | 578.9 | 487.6 |
| | Std Dev Yield Stress | 210.8 | 1857.1 | 97.9 | 78.4 |
| Tensile - MD | % Elongation (%) | 542.4 | 441.0 | 565.2 | 635.6 |
| | Tensile at break (PSI) | 5723.5 | 3766.1 | 6075.9 | 5871.6 |
| | Yield Stress (PSI) | 3481.5 | 3766.1 | 2719.8 | 2817.3 |
| | Std Dev % Elongation | 20.2 | 46.2 | 16.6 | 44.8 |
| | Std Dev tensile at break | 468.3 | 31.2 | 899.7 | 773.8 |
| | Std Dev Yield Stress | 136.2 | 31.2 | 94.8 | 45.0 |

Polymers for the Films of Table 7

Examples 2-8

A homopolymer of propylene, is produced in a single, continuous bulk phase (condensed propylene) loop reactor. A Ziegler-Natta catalyst, which includes a titanium catalytic active metal species supported on a magnesium chloride support, which is commercially available as Toho series C, group JC, is suspended in Kaydol white mineral oil, available from Witco, and stored in a stirred catalyst feed tank. The suspended catalyst is pumped directly into a nominal 150 gallon continuous, pumped loop reactor. The desired temperature of the reactor is 70-76° C., controlled with an external cooling jacket on the loop reactor. An external alkoxysilane donor, which is commercially available from Degussa-Huels, $[(CH_2)_4CH]_2Si(OMe)_2$ (and is often referred to as D-Donor) diluted with hexane as appropriate to facilitate flow control, is fed continuously to the reactor in the amount needed to reduce the xylene extractable fraction to less than 1%, measured as described above. The target concentration of the external donor in the liquid propylene, corrected for solids, is 150 ppm. Aluminum alkyl cocatalysts diluted with hexane as appropriate to facilitate flow control, (triethylaluminum, $AlEt_3$ commonly called TEAL) are added to the propylene feed stream to adjust the TEAL concentration in the liquid propylene to a control target of 150 ppm in the liquid propylene.

A polymerization of propylene is conducted with the reactor polymer solids ranging from 20-45 wt. %. A chain transfer agent, hydrogen, is continuously fed to the reactor, to produce a 10 g/10 min MFR propylene homopolymer, as measured by ASTM D 1238-01. The reactor discharge stream is degassed in a vessel to separate the liquid propylene and process lights from the polypropylene powder product. The degassed powder then is continuously forwarded to a Hosokawa Bepex Torus Disc heat exchanger and then to a purge column where counter flow of humidified nitrogen removes residual monomer. Reactor powder is collected in boxes and sent to a separate compounding facility.

The homopolymer produced is pelletized with various amounts of nucleator/clarifier additives as set forth in Table 7. Antioxidants Irgafos™ 168, Tris(2,4-di-t-butylphenyl)phosphite, and Irganox™ 1010, Tetrakismethylene(3,5-di-t-butyl-4-hydroxyhydrocinnamate) methane, which are combined in equal weight percents, the equal weight mixture being commercially available from CIBA Specialty Chemical under the trade name Irganox B225 is added at a level 2000 ppm. The nucleator/clarifier additives and B225 are added to the polypropylene powder using a 30 mm twin screw extruder, pelletized and placed into boxes.

Monolayer Films of Table 7

Examples 1A, 1B, and 2 Through 8

The resin for Examples 1a and 1b is the same as the resin used for Example 1, described earlier. The resins for Examples 2-8 are made as described above in the section entitled "Polymers for the Films of Table 7 (Examples 2-8)." All the films of Table 7 are made in a similar manner to the monolayer films of Tables 3, 4, and 5, except, a 40 mil die gap is utilized instead of the 70 mil die gap. The results obtained during the film blowing and the physical properties of the films are indicated in Table 7.

TABLE 7

Monolayer Extruded Blown Films

| | Examples | | | | | | | | |
|---|---|---|---|---|---|---|---|---|---|
| | Example 1a | Example 1b | 2 | 3 | 4 | 5 | 6 | 7 | 8 |
| Total Film Thickness | 1 mil | 2 mil | 1 mil | 1 mil | 2 mil | 1 mil | 2 mil | 1 mil | 1 mil |
| Maximum output rate | 165.8 | 165.7 | 131.8 | 130.3 | 131.2 | 122.1 | 123.8 | 150.4 | 133.3 |
| Specific Output rate lb/inch die circumference | 8.8 | 8.8 | 7.0 | 6.9 | 7.0 | 6.5 | 6.6 | 8.0 | 7.1 |
| Nucleator/Clarifier additive (ppm) | NA-11 850 ppm | NA-11 850 ppm | NA-21: 850 ppm | Millad 3988 850 ppm | Millad 3988 850 ppm | None | None | NA-11: 850 ppm | Millad 3988 2000 ppm |
| 1% CD-secant mod, psi | 266276 | 217978 | 291412 | 276904 | 220495 | 288697 | 222423 | 309675 | 297008 |
| 2%-CD-secant mod, psi | 212995 | 208968 | 214684 | 196452 | 189586 | 206927 | 195411 | 230848 | 210025 |
| 1% MD-secant mod, psi | 326146 | 242927 | 306687 | 293843 | 235832 | 303697 | 231433 | 339359 | 334622 |
| 2% MD-secant mod, psi | 237873 | 215142 | 222590 | 199226 | 194292 | 207681 | 195614 | 254869 | 236165 |
| Tensile-CD % Elongation at break (%) | 3.8 | 5.6 | 5.7 | 6.2 | 6.7 | 6.2 | 5.3 | 4.1 | 5.1 |

TABLE 7-continued

Monolayer Extruded Blown Films

| | Examples | | | | | | | | |
|---|---|---|---|---|---|---|---|---|---|
| | Example 1a | Example 1b | 2 | 3 | 4 | 5 | 6 | 7 | 8 |
| Tensile-CD at break (PSI) | 5476 | 6033 | 6368 | 5686 | 5772 | 5514 | 5182 | 5691 | 6300 |
| Yield Stress-CD (PSI) | 3939 | 2436 | 3307 | 3412 | 1861 | 3038 | 1781 | 3210 | 2959 |
| Tensile-MD % Elongation (%) | 7.3 | 6.2 | 11.4 | 258.2 | 13.9 | 105.6 | 26.0 | 7.9 | 8.8 |
| Tensile-MD at break (PSI) | 6530 | 6219 | 6540 | 5920 | 5888 | 6020 | 6028 | 6933 | 6598 |
| Yield Stress-MD (PSI) | 4401 | 3114 | 5347 | 5920 | 4980 | 5976 | 5746 | 3686 | 4770 |
| Clarity ASTM D1746 | 98.6 | 98.5 | 99.2 | 20.9 | 24.7 | 74.7 | 60.3 | 99.2 | 99.2 |
| Gloss 45° ASTM D2457 | 70.5 | 58.2 | 71.3 | 11.1 | 17.4 | 17.4 | 20.0 | 72.4 | 84.7 |
| Haze ASTM D1003 | 5.8 | 10.6 | 7.1 | 55.1 | 42.0 | 34.3 | 41.6 | 5.5 | 3.5 |
| Transmittance ASTM D1746 | 93.5 | 93.7 | 93.8 | 92.9 | 92.8 | 93.1 | 92.7 | 93.8 | 93.6 |
| Bubble Stability | Very Good | Very Good | Good | Good | Poor | Poor | Very Poor | Good | Good |

For the bubble stability indicated in Table 7: Very Good bubble stability indicates excellent dimensional stability along with a consistent frost line height that is maintained with virtually no observable vertical fluctuations during an hour long continuous film blowing fabrication operation. Good bubble stability indicates commercially acceptable dimensional stability along with a frost line height that is maintained with minimal vertical fluctuation during an hour long continuous film blowing fabrication operation. Poor bubble stability indicates that the frost line fluctuated in the vertical direction and that the bubble had poor dimensional stability, however a blown film was able to be manufactured at reduced rates. Very poor bubble stability indicates that the frost line fluctuated so severely and/or the bubble was so dimensionally unstable that extreme measures were necessary to prevent bubble collapse.

As can seen from Table 7, all the nucleated resins were much more effective (higher output rate, better optics, and increased film modulus) for blowing films than the non-nucleated resin. Additionally, NA-11 is much more effective for a given amount of nucleator/clarifier additive than either NA-21 or Millad 3988. Not only can better quality films be produced using ADK NA-11, but the use of NA-11 will also allow the cost of implementing the invention to be decreased versus other nucleator/clarifier additives. Therefore, ADK NA-11 and chemical derivatives, thereof, are the most preferred nucleator/clarifier additives to be used in the invention.

In addition to the above, the data of Table 7 shows that as the film thickness increases, the advantages of NA-11 over the other nucleator/clarifier additives becomes even more pronounced. While not wanting to limit the invention to any particular theory, it is believed that this advantage results from the faster crystallization rates that result from NA-11 versus other nucleator/clarifier additives. Also, the data tends to indicate that resins having a melt flow rate of about 8 g/10 min will outperform similar resins having a melt flow rate of from 10 to 11 g/10 min in films of the invention.

Fast Differential Scanning Calorimetry Analysis of the films of Table 7:

The films of Examples 1a, 2, 3, 5 and 8 of Table 7 are tested using a fast DSC scanning at a rate of 200° C./minute in accordance with the procedure described above. The Examples listed below and in FIGS. 8-10 correspond to the film samples of Table 7.

Figure 8:
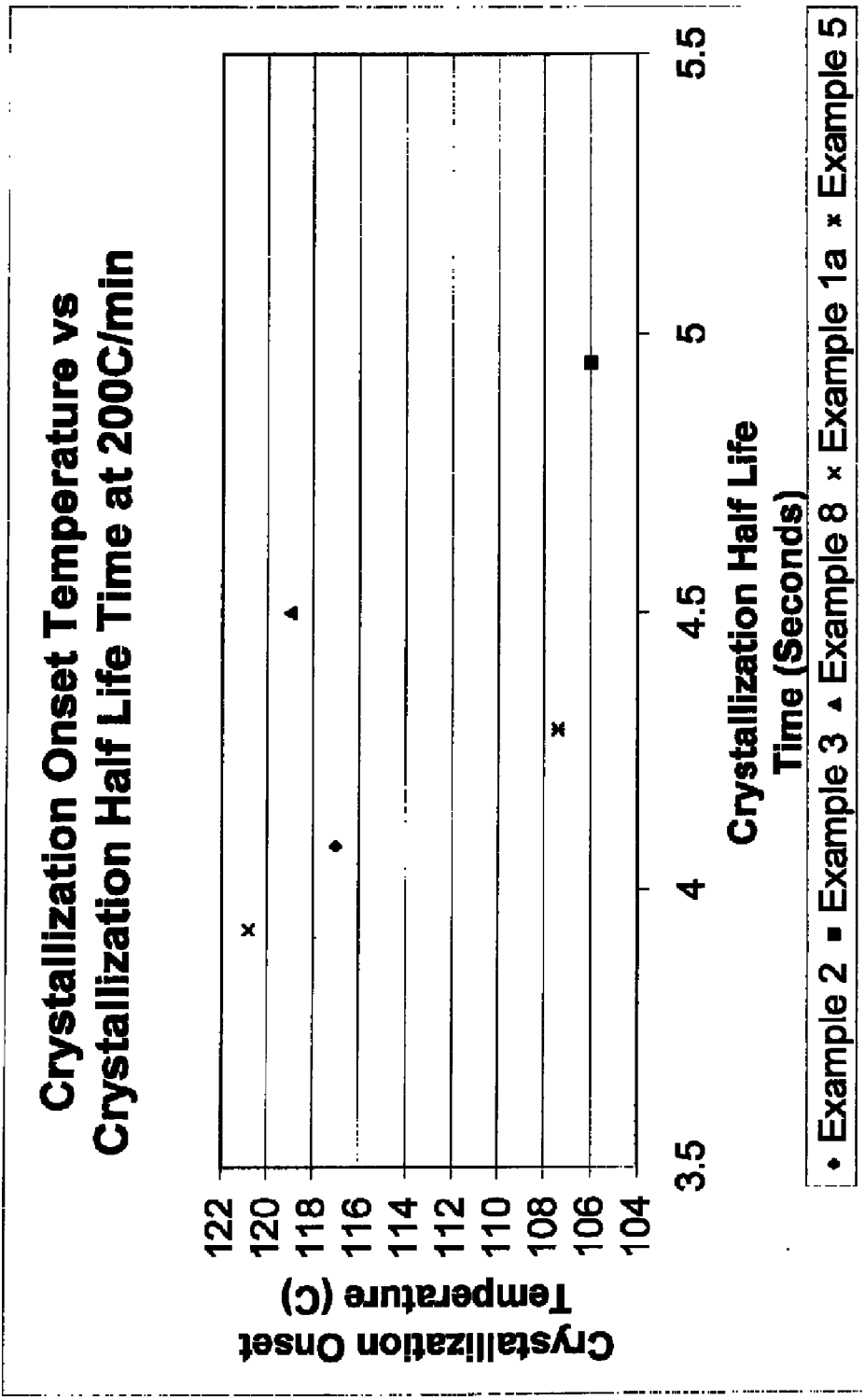
FIG. 8 is a graphical representation of crystallization onset temperature versus crystallization half-life time for the film samples of Examples 1a, 2, 3, 5 and 8 measured at a 200° C./minute DSC scan rate.

The values of crystallization onset temperature versus crystallization half-life time for the film samples of Examples 1a, 2, 3, 5, and 8 are graphically depicted in FIG. 8. A faster crystallization half-life time will lead to a higher crystallization rate (faster crystallization) during blown film forming operations. And, a higher crystallization onset temperature will mean that the composition will begin to crystallize sooner after leaving the extruder die.

Figure 9:
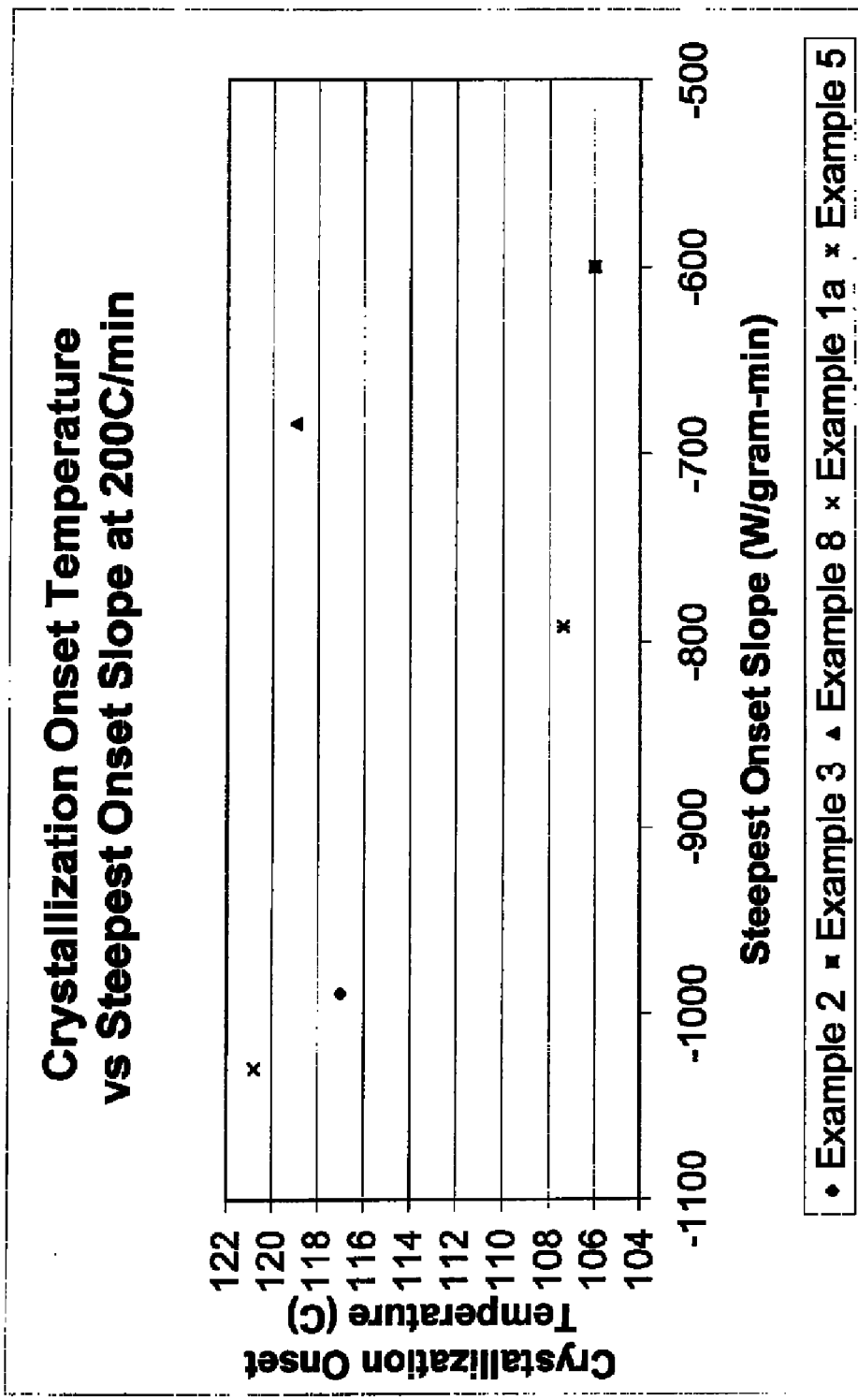
FIG. 9 is a graphical representation of crystallization onset temperature versus onset slope for the film samples of Examples 1a, 2, 3, 5 and 8 measured at a 200° C./minute DSC scan rate.

The values of crystallization onset temperature versus onset slope for the film samples of Examples 1a, 2, 3, 5 and 8 are graphically depicted in FIG. 9. As discussed earlier, a larger absolute value of the steepest onset slope translates to a higher crystallization rate (faster crystallization) during blown film forming operations.

The difference between the time for a sample to reach the peak crystallization temperature (Tc) and the time for the sample to reach the crystallization onset temperature (To) can be calculated from the corrected data acquired from the fast DSC runs. This time difference for each of the sample of Examples 1a, 2, 3, 5, and 8 are graphically shown in FIG. 10, which shows the values of crystallization onset temperature versus (tc–to). For FIG. 10 a shorter value for (tc–to) is indicative of a composition exhibiting a higher crystallization rate and faster crystallization during blown film forming operations.

Figure 10:
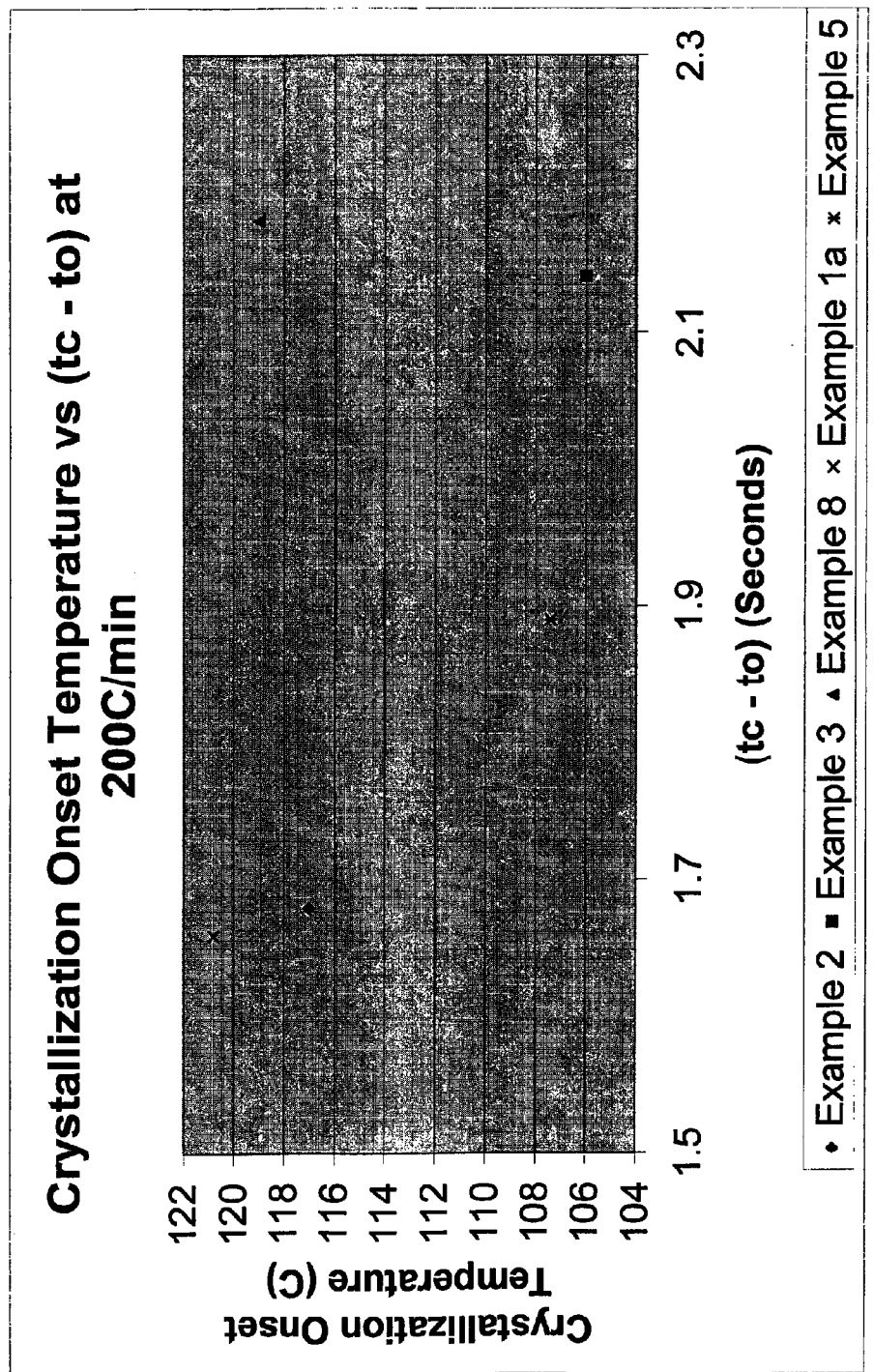
FIG. 10 is a graphical representation of the values of crystallization onset temperature versus (tc–to) for the film samples of Examples 1a, 2, 3, 5 and 8 measured at a 200° C./minute DSC scan rate.

As can be seen from FIGS. 8-10, the compositions containing ADK NA-11 and ADK NA-21 exhibit higher crystallization temperature and will also exhibit higher crystallization rates (faster crystallization) during blown film forming operations. This will lead to a more stable manufacturing process which will result in high quality films that can be manufactured at acceptable manufacturing rates. In particular, the compositions of Example 1a (which contain 850 ppm ADK NA-11, exhibit the highest peak crystallization temperature (115.3° C.), the highest crystallization onset temperature (120.8° C.), the fastest crystallization half-life time (3.93 seconds) and the shortest (tc–to) of 1.66 seconds, and the steepest onset slope (−1029 W/gram-minutes)) provide excellent blown films at production rates of greater than 8 lb/inch die circumference.

We claim:

1. A polypropylene, suitable for forming a blown film, the polypropylene comprising: a homopolymer polypropylene having a $M_w/M_n$ of less than 6.0, a melt flow rate in the range of from 8 to 13 g/10 min, less than 2% xylene solubles, a pentad isotacticity of greater than 95%, an isotactic pentad/triad ratio of greater than 95%, a crystallinity of at least 65%, and a crystallization temperature of at least 127° C., the polypropylene containing from 500 ppm to 2500 ppm of a nucleator/clarifier additive and wherein a blown film is capable of being manufactured from the resin at a rate of at least 6 lb/hr-in of die circumference and wherein a one mil thick blown film manufactured from the polypropylene using at least a 1.5 blow-up ratio exhibits a 1% secant modulus of at least 200,000 psi according to ASTM D882, a haze of less than 10 as measured by ASTM D1003, and a clarity of greater than 96%.

2. A polypropylene, suitable for forming a blown film, the polypropylene comprising: a polypropylene copolymer containing less than 2% by weight units of derived from ethylene and having a $M_w/M_n$ of less than 6.0, a melt flow rate in the range of from 8 to 13 g/10 min, less than 3% xylene solubles, a pentad isotacticity of greater than 91%, an isotactic pentad/triad ratio of greater than 95%, a crystallinity of at least 65%, and a crystallization temperature of at least 127° C., the polypropylene containing from 750 ppm to 2500 ppm of a nucleator/clarifier additive, wherein said additive is aluminum hydroxybis[2,4,8,10-tetrakis(1,1-dimethylethyl)-6-hydroxy-12H-dibenzo[d,g][1,3,2]dioxaphosphocin-6-oxidato], and wherein a blown film is capable of being manufactured from the polypropylene at a rate of at least 6 lb/hr-in of die circumference and wherein a one mil thick blown film manufactured from the polypropylene using at least a 1.5 blow-up ratio exhibits a 1% secant modulus of at least 150,000 psi according to ASTM D882, a haze of less than 10 as measured by ASTM D1003, and a clarity of greater than 96%.

3. The polypropylene of claim 2, wherein the polypropylene copolymer has a Mw/Mn of less than 5.5, less than 2% xylene solubles, a pentad isotacticity of greater than 95%, a isotactic pentad/triad ratio of greater than 98%, a crystallinity of at least 67%, and a crystallization temperature of at least 128° C.

4. The polypropylene of claim 3, wherein polypropylene copolymer contains from 0.1 to 0.7% by weight units derived from ethylene and wherein a one mil thick blown film manufactured from the polypropylene exhibits a 1% secant modulus of at least 165,000 psi according to ASTM D882.

5. The polypropylene of claim 3, wherein a one mil thick blown film manufactured from the polypropylene exhibits a 1% secant modulus of at least 180,000 psi according to ASTM D882.

6. The polypropylene of claim 3, wherein a one mil thick blown film manufactured from the polypropylene exhibits a 1% secant modulus of at least 200,000 psi according to ASTM D882.

7. The polypropylene of claim 2, wherein the one mil thick film manufactured from the polypropylene lies flat on the take up roll with no significant wrinkles and has a gauge variation of less than 10%.

8. An air quenched blown film made from the polypropylene of claim 2.

9. The film of claim 8, wherein the film comprises a monolayer film.

10. The film of claim 8, wherein the film comprises a multi layer, coextruded, blown film, the film being comprised of at least a first layer and a second layer, said polypropylene being contained in the first layer.

11. The film of claim 10, wherein the second layer comprises a thermoplastic.

12. The film of claim 10, wherein the second layer comprises an ethylene-based polymer having a majority of monomer units derived from ethylene.

13. The film of claim 8, wherein the film is manufactured at a rate of at least 6 lb/hr-inch die circumference using a blow-up ratio of at least 1.5.

14. The film of claim 8, wherein the film is manufactured at a rate of at least 8 lb/hr-inch die circumference using a blow-up ratio of at least 1.5.

15. The film of claim 13 or 14, wherein the film is manufactured using a blow-up ratio of at least 2.5.

16. The film of claim 11, wherein the second layer is comprised of polymers selected from the group consisting of: EVOH, PVDC, polyvinylidene chloride, EVA, EAA, maleic anhydride grafted polypropylene or polyethylene, EMA, ethylene-acrylate copolymers, acrylic acid copolymers, and mixtures thereof.

* * * * *